United States Patent [19]
Andersson

[11] Patent Number: 6,046,749
[45] Date of Patent: Apr. 4, 2000

[54] METHOD FOR THE MODIFICATION OF THREE-DIMENSIONAL OBJECTS

[75] Inventor: Håkan Andersson, Eskilstuna, Sweden

[73] Assignee: Autodesk, Inc., San Rafael, Calif.

[21] Appl. No.: 08/910,976

[22] Filed: Aug. 7, 1997

[30] Foreign Application Priority Data

Aug. 9, 1996 [DE] Germany .................. 196 32 223

[51] Int. Cl.$^7$ .................................. G06F 15/00
[52] U.S. Cl. .................. 345/436; 345/437; 345/438
[58] Field of Search .................. 345/433, 436, 345/437, 438

[56] References Cited

U.S. PATENT DOCUMENTS

| | | |
|---|---|---|
| 4,835,528 | 5/1989 | Flinchbaugh . |
| 5,581,665 | 12/1996 | Sugiura et al. .................. 345/419 |
| 5,588,098 | 12/1996 | Chen et al. .................. 345/437 |
| 5,825,365 | 10/1998 | Hirota et al. .................. 345/433 |

FOREIGN PATENT DOCUMENTS

WO 95/11480  4/1995  WIPO .

Primary Examiner—Mark K. Zimmerman
Assistant Examiner—Chante' E. Harrison
Attorney, Agent, or Firm—Gates & Cooper

[57] ABSTRACT

Method for the modification of three-dimensional objects via an input device allowing only two-dimensional input. The method comprises creating a three-dimensional object and displaying a three-dimensional representation of the object. The method further comprises activating the three-dimensional object and displaying a representation of a three-dimensional coordinate system. One of the axes of the three-dimensional coordinate system assigned to the object is selected, and the origin of the assigned coordinate system is shifted within a global three-dimensional coordinate system along a line defined by the orientation of the selected axis of the assigned coordinate system. The three-dimensional object is then computed relative to the global coordinate system after shifting according to the displacement of the origin of the assigned coordinate system. A representation of the shifted three-dimensional object is then displayed on the computer screen.

33 Claims, 1 Drawing Sheet

METHOD FOR THE MODIFICATION OF THREE-DIMENSIONAL OBJECTS

TECHNICAL FIELD

The following invention relates to a method for the modification of a three-dimensional object displayed on a computer screen with the help of an input device.

BACKGROUND OF THE INVENTION

Known graphics programs provide a multitude of possibilities to modify a displayed object. For example, it is possible to move the object to a different location, to rotate the object, or to compress or stretch the object in one or two dimensions.

High-end graphics programs, such as the AutoCAD® application software, are furthermore able to display several views of a given object simultaneously on the screen. These views usually include a three-dimensional view (e.g., isometric view). These graphics programs, however, allow modifications to the object only in the two-dimensional representations. When a change is performed in one two-dimensional view, the corresponding change is calculated for the other two-dimensional views. The user can thus view the effects of a modification that is performed simultaneously in all views, even in the three-dimensional view. These graphics programs, however, do not allow direct modifications to the object shown in the three-dimensional view.

SUMMARY OF THE INVENTION

It is the task of the present invention to provide a method for the direct modification of an object in the three-dimensional view with the help of an input device, preferably a mouse input device allowing only two-dimensional input.

This task is accomplished by a method comprising the following steps:

Creating a three-dimensional object; displaying a three-dimensional representation of the three-dimensional object on a computer screen; activating the three-dimensional object through an operation of the input device relating to the representation of the object; displaying a representation of a three-dimensional coordinate system on the computer screen—with the three-dimensional coordinate system being assigned to the active three-dimensional object; selecting one of the axes of the three-dimensional coordinate system assigned to the object by way of an operation of the input device—with the input operation relating to the representation of the coordinate system displayed on the screen; shifting the origin of the coordinate system assigned to the object within a global three-dimensional coordinate system along a line defined by the orientation of the selected axis of the assigned coordinate system within the global three-dimensional coordinate system, and in a direction which is determined by an operation performed with the input device; computing the three-dimensional object relative to the global coordinate system after moving the object in accordance with the movement of the origin of the assigned coordinate system; and displaying a representation of the shifted three-dimensional object on the computer screen.

According to a preferred embodiment, the displayed object can also be rotated which is achieved by the following additional steps:

Selecting a first axis of the three-dimensional coordinate system assigned to the object through an operation of the input device with the input operation relating to the representation of the assigned coordinate system displayed on the screen; rotating the assigned coordinate system around either the second or third coordinate axis—with the second axis being selected, if a movement of the first axis towards the third axis is induced by means of the input device and whereby the rotation is performed around the third axis, if a movement of the first axis towards the second axis is induced by means of the input device; computing the three-dimensional object relative to the global coordinate system after rotation of the object in accordance with the rotation of the assigned coordinate system; and displaying a representation of the rotated three-dimensional object on the computer screen.

Preferably, the method according to the invention furthermore provides the ability to scale the three-dimensional object, which is achieved by the following steps:

Selecting an axis of the three-dimensional coordinate system assigned to the object through an operation of the input device with the input operation relating to the representation of the assigned coordinate system displayed on the screen; effectuating an extension or stretch operation to the selected axis of the coordinate system assigned to the object by means of the input device; computing the three-dimensional object relative to the global coordinate system after positive or negative stretch of the object along the selected axis of the assigned coordinate system; and displaying a three-dimensional representation of the stretched (or compressed) three-dimensional object on the computer screen.

DETAILED DESCRIPTION OF THE INVENTION

The present invention provides for the modification of an object using a three-dimensional representation of the object. Input operations to control the modification are performed preferably with the help of a mouse input device. As is generally known, a computer mouse can be used to perform click operations as well as shift operations. According to a preferred embodiment [of the invention], the task of transposing two-dimensional mouse operations onto a three-dimensional object s accomplished by realizing the modification of the displayed object indirectly through a modification of the coordinate system assigned to the object in question. Preferably, the representation of the assigned coordinate system includes discrete modification points, so as to provide a reliable means for detecting the type of modification the user intended to induce through a mouse operation performed. The fact, that the displayed coordinate system includes the above-mentioned modification points at its origin as well as at the endpoints of the three axes displayed, allows the software to determine whether the user intends to perform a modification starting from the origin of the coordinate system or from the endpoints of one of the axes. Clicking on the center of the coordinate system can, for example, be aimed at inducing an operation for shifting the entire coordinate system across the screen. The direction into which the coordinate system is moved [during this operation] must preferably be identical to one of the three main directions determined by [the axes of] the coordinate system. The actual direction of the movement is determined preferably by evaluating a mouse operation performed by the user and comparing the vector of motion derived from this operation to the vectors of the main axes. The modification is then performed along the axis which best matches the vector derived.

A rotation of the coordinate system and therefore of the object as well as of the object's representation is realized preferably by selecting one of the modification points at the endpoints of the axes and afterwards performing a mouse operation pointing towards one of the other two axes. This results in a rotation around the axis which was neither selected nor is parallel to the mouse movement. Similarly, it is also possible to scale the object as well as the representation of the object by scaling the assigned coordinate system. This is again realized preferably by selecting one of the modification points at the endpoints of the axes of the coordinate system and afterwards performing a mouse operation along the same axis. Moving the mouse pointer towards the origin of the coordinate system results in a reduction of the corresponding dimension of the object, whereas moving the mouse pointer away from the origin of the coordinate system results in an extension of the object.

Further preferred embodiments of the present invention are defined by the dependent claims below.

Figure 1:
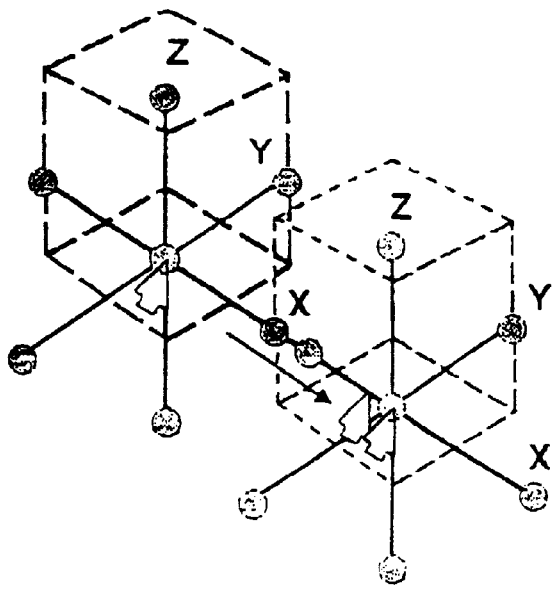
FIG. 1 illustrates the operation to be performed by the user in order to accomplish a displacement of the object marked by the dashed outlines along one of the axes X, Y, Z of the assigned coordinate system.
Figure 2:
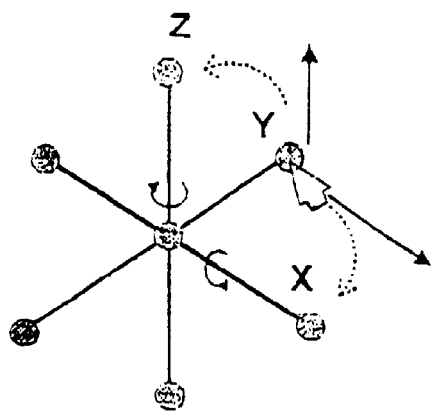
FIG. 2 illustrates in which way a rotation of the coordinate system and thus of the assigned object can be performed.
Figure 3:
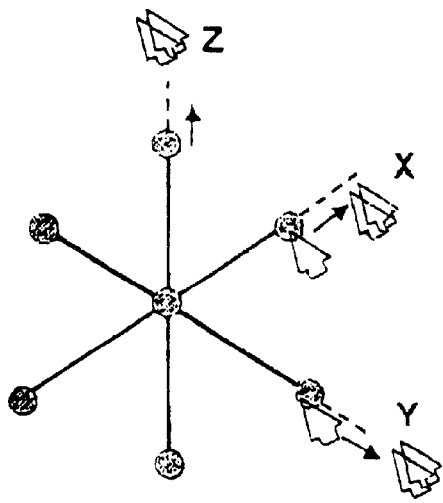
FIG. 3 illustrates in which way the coordinate system and thus the assigned object can be scaled.

In the following, the invention is explained in more detail with reference to the enclosed drawings. FIGS. 1 through 3 contain representations of a coordinate system assigned to a three-dimensional object as well as outlined mouse operations to illustrate the move, rotate and scale modifications of objects.

The present invention is especially suited for use in conjunction with the AutoCAD® graphics application software or similar software programs. These applications include databases providing basic objects such as cylinders, rectangles etc.; the user can retrieve these objects from the database and then apply appropriate modifications to scale them to the desired size and fit them into position. Preferably, in the process of retrieving these basic objects from the database, they are intelligently assigned a coordinate system, which is generally arranged in such a way that its coordinate axes are orthogonal or parallel to the main faces of the respective body.

According to a preferred embodiment, an object retrieved from the database is displayed on the screen in isometric view and after the object has been activated by means of a mouse click, a representation of the coordinate system assigned to the object is displayed. This representation of the coordinate system includes given modification points, which have to be selected before a modification can be performed.

Providing discrete modification points facilitates the translation of a given mouse operation to the desired type of modification. Therefore, the representation of the coordinate system preferably includes a modification symbol at its origin as well as at both endpoints of all three coordinate axes. The coordinate system is preferably displayed at the object's origin, but can also be placed outside the element. Placing the coordinate system outside the object allows in particular rotary movements of the object around an external axis, which is described in more detail below.

FIG. 1 contains a representation of the coordinate system assigned to an object as displayed on the screen. Since the representation must be isometric, the axes of the displayed coordinate system are not perpendicular to each other, as is the case for the actually assigned coordinate system used for computing the modified object. According to the present invention, a modification effected by the user along one of the three axes is detected by tracking the movement performed by the user with the mouse and deriving a vector of motion from this operation. The orientation of the vector is then compared to the orientation of the axes of the isometric representation of the coordinate system on the screen. The operation performed by the user is deemed a movement towards the axis which best matches the vector obtained. Such verification can be realized by projecting the derived vector onto the corresponding axes, as is known to the skilled man.

FIG. 1 illustrates the operation to be performed by the user in order to accomplish a displacement of the object marked by the dashed outlines along one of the axes X, Y, Z of the assigned coordinate system. First, the user selects the spherical modification point in the center of the displayed coordinate system inducing the system to expect a shift operation to follow. As mentioned above, the subsequent mouse operation is being traced in order to obtain a corresponding vector of motion. This vector is then compared to the displayed coordinate axes with regard to its direction, and a displacement is performed in the direction of the axis whose orientation best matches the obtained vector. The extent of the displacement is proportional to the mouse movement performed by the user. The movement of the coordinate system across the screen along a given axis results in a displacement of the coordinate system assigned to the object within a global coordinate system. Based on the relocation of the coordinate system, then the position of the assigned object within the global coordinate system can be determined and the respective object can be saved with these new (absolute) coordinates. Based on the thus computed object, a representation of the object on the screen in isometric view can be derived, so that a representation of the shifted object immediately after moving the representation of the coordinate system across the screen is displayed at the corresponding position on the monitor.

FIG. 2 illustrates in which way a rotation of the coordinate system and thus of the assigned object can be performed. To perform a rotation, for example around the Z-axis, one of the modification points at the ends of the Y-axis is being selected and afterwards a movement along the X-axis is performed. A rotation around the Z-axis can obviously also be realized by activating a modification point on the X-axis and afterwards performing an appropriate mouse operation in the direction of the Y-axis. Similar to the shift operation, the resulting rotation of the object is being calculated on the basis of the rotation of the assigned coordinate system. After computation, a description of the object relative to the global coordinate system is available taking into consideration the rotation performed. Based on these new object data, a representation of the object suitable for display can be computed and displayed on the screen. Thus, a properly rotated representation of the object is displayed almost immediately after conclusion of the rotation of the coordinate system.

FIG. 3 illustrates in which way the coordinate system and thus the assigned object can be scaled. To compress or stretch the object in the direction of the Y-axis, a modification point on the Y-axis is being selected and shifted towards the center of the coordinate system or away from it. The representation of the assigned object is then displayed stretched by an appropriate value in the direction of the Y-axis.

As mentioned above, the position of the assigned coordinate system relative to the corresponding object can preferably be freely determined. This is especially useful, if several objects are combined, because this allows the user to choose a convenient reference point. In particular, the origin of the coordinate system can be placed outside the assigned object to allow a rotation of the object around an external axis. As explained before, initially, the assigned coordinate system will preferably be placed at the origin of the corresponding object. Nevertheless, it can be intelligently assigned right from the start in that the coordinate system is fitted to the main faces of the body in question in the best possible way. Once the user shifts the coordinate system from the originally assigned position, this displacement is preferably stored so that the coordinate system is displayed again at that special position whenever the corresponding object is being activated again.

The corresponding German Patent Application No. 196 32 223.5, filed Aug. 9, 1996, is hereby incorporated by reference.

Although the present invention has been described in terms of preferred embodiments, it is not intended that the invention be limited to these embodiments. Modifications within the scope of the present invention will be apparent. The scope of the present invention is defined by the claims that follow.

I claim:

1. Method for the modification of three-dimensional objects by means of an input device, comprising the following steps:

creating a three-dimensional object;

displaying a three-dimensional representation of the three dimensional object on a computer screen;

activating the three-dimensional object by way of an operation of the input device relating to the representation of the object;

displaying a representation of a three-dimensional coordinate system on the computer screen with the three-dimensional coordinate system being assigned to the activated three-dimensional object;

selecting one of the axes of the three-dimensional coordinate system assigned to the object by means of an operation of the input device, with the input operation relating to the representation of the coordinate system displayed on the screen;

shifting the origin of the coordinate system assigned to the object within a global three-dimensional coordinate system along a line defined by the orientation of the selected axis of the assigned coordinate system within the global three-dimensional coordinate system, and in one direction (of the line) which is determined by an operation performed with the input device;

computing the three-dimensional object relative to the global coordinate system after moving the object in accordance with the movement of the origin of the assigned coordinate system; and displaying a representation of the shifted three-dimensional object on the computer screen;

wherein the representation of the assigned coordinate system displayed on the screen is provided with modification points at its origin as well as at the endpoints of the axes displayed and a modification of the coordinate system can be performed only by clicking on these symbols.

2. Method according to claim 1 including the following further steps:

selecting a first axis of the three-dimensional coordinate system assigned to the object by way of an operation of the input device with the input operation relating to the representation of the assigned coordinate system displayed on the screen;

rotating the assigned coordinate system around either the second or third coordinate axis with the second axis being selected, if a movement of the first axis towards the third axis is induced by means of the input device and wherein the rotation is performed around the third axis if a movement of the first axis towards the second axis is induced by means of the input device;

computing the three-dimensional object relative to the global coordinate system after rotation of the object in accordance with the rotation of the assigned coordinate system; and displaying a representation of the rotated three-dimensional object on the computer screen.

3. Method according to claim 1 including the following further steps:

selecting an axis of the three-dimensional coordinate system assigned to the object by way of an operation of the input device with the input operation relating to the representation of the assigned coordinate system displayed on the screen;

effectuating a stretch operation (extension or compression) to the selected axis of the coordinate system assigned to the object by means of the input device;

computing the three-dimensional object relative to the global coordinate system after stretching or compressing the object along the selected axis of the assigned coordinate system; and displaying a three-dimensional representation of the stretched or compressed three-dimensional object on the computer screen.

4. Method according to claim 1, with the input device being a computer mouse which can be used to select the axes of the assigned coordinate system by clicking; the mouse can further be used to induce a displacement of the assigned coordinate system or movement of one of the axes of the assigned coordinate system to effectuate a rotation or stretch of one of the axes of the assigned coordinate system by means of an appropriately directed mouse operation.

5. Method according to claim 4, wherein a performed mouse click or shift operation is translated to the object modification which—taking into consideration the representation of the three-dimensional object displayed on the screen or the assigned coordinate system—from the choice of possible modification types best matches the user's intention.

6. Method according to claim 1, wherein the displacement of the assigned coordinate system is induced by clicking the modification point at the origin of the representation of the assigned coordinate system and subsequently performing an accordingly directed movement with the mouse; wherein a rotation of the assigned coordinate system is induced by clicking the modification points at one of the axes of the representation of the assigned coordinate system and subsequently performing an accordingly directed movement with the mouse; and wherein a stretch or compression of an axis of the assigned coordinate system is induced by clicking a modification point of the respective axis of the representation of the assigned coordinate system and subsequently performing an accordingly directed movement with the mouse along the respective axis of the representation.

7. Method according to claim 1, wherein the position of the modification points can be freely selected and is not required to lie on the axes of the coordinate system.

8. Method according to claim 1, wherein the position of the origin of the assigned coordinate system can be freely selected relative to the corresponding object and can in particular lie outside the object.

9. Method according to claim 1, wherein the assigned coordinate system can be moved or rotated or scaled without this modification having any effect on the related object.

10. Method according to claim 1, wherein the assigned coordinate system can be moved, rotated or scaled in order to be attributed to another object without this modification having immediate influence on the related object and the related object being afterwards relocated to the position determined by the coordinate system and shifted to the appropriate orientation.

11. Method according to claim 1, wherein the position of the coordinate system assigned to an object retrieved from a database is automatically chosen in such a way that it best suits the shape of the object.

12. An apparatus for the modification of three-dimensional objects by means of an input device, comprising:
means for displaying a three-dimensional representation of a three-dimensional object on a computer screen;
means for activating the three-dimensional object by way of an operation of the input device relating to the representation of the object;
means for displaying a representation of a three-dimensional coordinate system on the computer screen with the three-dimensional coordinate system being assigned to the activated three-dimensional object;
means for selecting one of the axes of the three-dimensional coordinate system assigned to the object by means of an operation of the input device, with the input operation relating to the representation of the coordinate system displayed on the screen;
means for shifting the origin of the coordinate system assigned to the object within a global three-dimensional coordinate system along a line defined by the orientation of the selected axis of the assigned coordinate system within the global three-dimensional coordinate system, and in one direction (of the line) which is determined by an operation performed with the input device;
means for computing the three-dimensional object relative to the global coordinate system after moving the object in accordance with the movement of the origin of the assigned coordinate system; and
means for displaying a representation of the shifted three-dimensional object on the computer screen;
wherein the representation of the assigned coordinate system displayed on the screen is provided with modification points at its origin as well as at the endpoints of the axes displayed and a modification of the coordinate system can be performed only by clicking on these symbols.

13. Apparatus according to claim 12, further comprising:
means for selecting a first axis of the three-dimensional coordinate system assigned to the object by way of an operation of the input device with the input operation relating to the representation of the assigned coordinate system displayed on the screen;
means for rotating the assigned coordinate system around either the second or third coordinate axis with the second axis being selected, if a movement of the first axis towards the third axis is induced by means of the input device and wherein the rotation is performed around the third axis if a movement of the first axis towards the second axis is induced by means of the input device;
means for computing the three-dimensional object relative to the global coordinate system after rotation of the object in accordance with the rotation of the assigned coordinate system; and
means for displaying a representation of the rotated three-dimensional object on the computer screen.

14. Apparatus according to claim 12, further comprising:
means for selecting an axis of the three-dimensional coordinate system assigned to the object by way of an operation of the input device with the input operation relating to the representation of the assigned coordinate system displayed on the screen;
means for effectuating a stretch operation (extension or compression) to the selected axis of the coordinate system assigned to the object by means of the input device;
means for computing the three-dimensional object relative to the global coordinate system after stretching or compressing the object along the selected axis of the assigned coordinate system; and
means for displaying a three-dimensional representation of the stretched or compressed three-dimensional object on the computer screen.

15. Apparatus according to claim 12, wherein the input device comprises a computer mouse that can be used to select the axes of the assigned coordinate system by clicking.

16. Apparatus according to claim 15, further comprising means for translating a performed mouse click or shift operation to the object modification that, from the choice of possible modification types, best matches the user's intention, taking into consideration the representation of the three-dimensional object displayed on the screen or the assigned coordinate system.

17. Apparatus according to claim 12, further comprising means for inducing a displacement of the assigned coordinate system by clicking the modification point at the origin of the representation of the assigned coordinate system and subsequently performing an accordingly directed movement with the mouse;
wherein a rotation of the assigned coordinate system is induced by clicking the modification points at one of the axes of the representation of the assigned coordinate system and subsequently performing an accordingly directed movement with the mouse;
and wherein a stretch or compression of an axis of the assigned coordinate system is induced by clicking a modification point of the respective axis of the representation of the assigned coordinate system and subsequently performing an accordingly directed movement with the mouse along the respective axis of the representation.

18. Apparatus according to claim 12, wherein the position of the modification points can be freely selected and is not required to lie on the axes of the coordinate system.

19. Apparatus according to claim 12, wherein the position of the origin of the assigned coordinate system can be freely selected relative to the corresponding object and can in particular lie outside the object.

20. Apparatus according to claim 12, further comprising means for moving or rotating or scaling the assigned coordinate system without this modification having any effect on the related object.

21. Apparatus according to claim 12, further comprising means for moving, rotating or scaling the assigned coordinate system in order to be attributed to another object without this modification having immediate influence on the related object and the related object being afterwards relocated to the position determined by the coordinate system and shifted to the appropriate orientation.

22. Apparatus according to claim 12, further comprising means for automatically choosing the position of the coordinate system assigned to an object retrieved from a database in such a way that it best suits the shape of the object.

23. An article of manufacture comprising a program storage medium readable by a computer and embodying one or more instructions executable by the computer to perform method steps for the modification of three-dimensional objects by means of an input device, the method comprising the steps of:

displaying a three-dimensional representation of a three-dimensional object on a computer screen;

activating the three-dimensional object by way of an operation of the input device relating to the representation of the object;

displaying a representation of a three-dimensional coordinate system on the computer screen with the three-dimensional coordinate system being assigned to the activated three-dimensional object;

selecting one of the axes of the three-dimensional coordinate system assigned to the object by means of an operation of the input device, with the input operation relating to the representation of the coordinate system displayed on the screen;

shifting the origin of the coordinate system assigned to the object within a global three-dimensional coordinate system along a line defined by the orientation of the selected axis of the assigned coordinate system within the global three-dimensional coordinate system, and in one direction (of the line) which is determined by an operation performed with the input device;

computing the three-dimensional object relative to the global coordinate system after moving the object in accordance with the movement of the origin of the assigned coordinate system; and displaying a representation of the shifted three-dimensional object on the computer screen;

wherein the representation of the assigned coordinate system displayed on the screen is provided with modification points at its origin as well as at the endpoints of the axes displayed and a modification of the coordinate system can be performed only by clicking on these symbols.

24. Article of manufacture according to claim 23, wherein the method further comprises:

selecting a first axis of the three-dimensional coordinate system assigned to the object by way of an operation of the input device with the input operation relating to the representation of the assigned coordinate system displayed on the screen;

rotating the assigned coordinate system around either the second or third coordinate axis with the second axis being selected, if a movement of the first axis towards the third axis is induced by means of the input device and wherein the rotation is performed around the third axis if a movement of the first axis towards the second axis is induced by means of the input device;

computing the three-dimensional object relative to the global coordinate system after rotation of the object in accordance with the rotation of the assigned coordinate system; and displaying a representation of the rotated three-dimensional object on the computer screen.

25. Article of manufacture according to claim 23, wherein the method further comprises:

selecting an axis of the three-dimensional coordinate system assigned to the object by way of an operation of the input device with the input operation relating to the representation of the assigned coordinate system displayed on the screen;

effectuating a stretch operation (extension or compression) to the selected axis of the coordinate system assigned to the object by means of the input device;

computing the three-dimensional object relative to the global coordinate system after stretching or compressing the object along the selected axis of the assigned coordinate system; and displaying a three-dimensional representation of the stretched or compressed three-dimensional object on the computer screen.

26. Article of manufacture according to claim 23, wherein the input device comprises a computer mouse that can be used to select the axes of the assigned coordinate system by clicking; the mouse can further be used to induce a displacement of the assigned coordinate system or movement of one of the axes of the assigned coordinate system to effectuate a rotation or stretch of one of the axes of the assigned coordinate system by means of an appropriately directed mouse operation.

27. Article of manufacture according to claim 26, wherein a performed mouse click or shift operation is translated to the object modification that, from the choice of possible modification types, best matches the user's intention, taking into consideration the representation of the three-dimensional object displayed on the screen or the assigned coordinate system.

28. Article of manufacture according to claim 23, wherein a displacement of the assigned coordinate system is induced by clicking the modification point at the origin of the representation of the assigned coordinate system and subsequently performing an accordingly directed movement with the mouse;

wherein a rotation of the assigned coordinate system is induced by clicking the modification points at one of the axes of the representation of the assigned coordinate system and subsequently performing an accordingly directed movement with the mouse;

and wherein a stretch or compression of an axis of the assigned coordinate system is induced by clicking a modification point of the respective axis of the representation of the assigned coordinate system and subsequently performing an accordingly directed movement with the mouse along the respective axis of the representation.

29. Article of manufacture according to claim 23, wherein the position of the modification points can be freely selected and is not required to lie on the axes of the coordinate system.

30. Article of manufacture according to claim 23, wherein the position of the origin of the assigned coordinate system can be freely selected relative to the corresponding object and can in particular lie outside the object.

31. Article of manufacture according to claim 23, wherein the assigned coordinate system can be moved or rotated or scaled without this modification having any effect on the related object.

32. Article of manufacture according to claim 23, wherein the assigned coordinate system can be moved, rotated or scaled in order to be attributed to another object without this modification having immediate influence on the related object and the relating object being afterwards relocated to the position determined by the coordinate system and shifted to the appropriate orientation.

33. Article of manufacture according to claim 23, wherein the position of the coordinate system assigned to an object retrieved from a database is automatically chosen in such a way that it best suits the shape of the object.

* * * * *